US012395024B2

(12) United States Patent
Furuta

(10) Patent No.: US 12,395,024 B2
(45) Date of Patent: Aug. 19, 2025

(54) ROTOR

(71) Applicant: AISIN CORPORATION, Aichi (JP)

(72) Inventor: Yasunari Furuta, Kariya (JP)

(73) Assignee: AISIN CORPORATION, Kariya (JP)

( * ) Notice: Subject to any disclaimer, the term of this patent is extended or adjusted under 35 U.S.C. 154(b) by 121 days.

(21) Appl. No.: 18/267,549

(22) PCT Filed: Feb. 25, 2022

(86) PCT No.: PCT/JP2022/007850
§ 371 (c)(1),
(2) Date: Jun. 15, 2023

(87) PCT Pub. No.: WO2022/209480
PCT Pub. Date: Oct. 6, 2022

(65) Prior Publication Data
US 2024/0039354 A1 Feb. 1, 2024

(30) Foreign Application Priority Data

Mar. 30, 2021 (JP) ................................. 2021-058434

(51) Int. Cl.
*H02K 1/32* (2006.01)
*H02K 1/276* (2022.01)
*H02K 7/108* (2006.01)
*H02K 9/19* (2006.01)

(52) U.S. Cl.
CPC ............. *H02K 1/32* (2013.01); *H02K 1/2766* (2013.01); *H02K 7/108* (2013.01); *H02K 9/19* (2013.01)

(58) Field of Classification Search
CPC ........ H02K 9/19; H02K 1/2766; H02K 7/108; H02K 1/32; H02K 2213/03; Y02T 10/64
USPC .......................................................... 310/59
See application file for complete search history.

(56) References Cited

U.S. PATENT DOCUMENTS

| | | | | |
|---|---|---|---|---|
| 8,928,195 | B2 * | 1/2015 | Ohashi | H02K 9/19 |
| | | | | 310/58 |
| 9,154,006 | B2 * | 10/2015 | Yamamoto | H02K 1/2766 |
| 9,847,682 | B2 * | 12/2017 | Takahashi | H02K 1/28 |
| 10,396,628 | B2 * | 8/2019 | Gi | H02K 7/003 |
| 10,505,420 | B2 * | 12/2019 | Asahi | H02K 1/2766 |
| 10,931,158 | B2 * | 2/2021 | Shono | H02K 9/08 |
| 2015/0137632 | A1 * | 5/2015 | Takahashi | H02K 1/28 |
| | | | | 310/216.106 |
| 2020/0358326 | A1 * | 11/2020 | Takahashi | H02K 1/30 |

FOREIGN PATENT DOCUMENTS

| | | | | |
|---|---|---|---|---|
| CN | 113541397 | A * | 10/2021 | |
| JP | 5991545 | B2 * | 9/2016 | ......... H02K 1/2766 |
| JP | 2017200333 | A * | 11/2017 | |
| JP | 2018085871 | A * | 5/2018 | ......... H02K 1/2706 |
| JP | 2018170943 | A * | 11/2018 | |
| JP | 2019-115217 | A | 7/2019 | |
| JP | 2019187063 | A * | 10/2019 | |

* cited by examiner

Primary Examiner — Alex W Mok
(74) Attorney, Agent, or Firm — Oliff PLC

(57) ABSTRACT

In this rotor, a first end plate includes a first opening portion that is provided at a first position corresponding to a position where a crimped portion is not arranged, and is connected to a first oil flow path, and a second end plate includes a second opening portion that is provided at a second position corresponding to a position where the crimped portion is arranged, and is connected to a second oil flow.

10 Claims, 3 Drawing Sheets

ROTOR

TECHNICAL FIELD

The present disclosure relates to a rotor.

BACKGROUND ART

Conventionally, a rotor including a rotor hub is known. Such a rotor is disclosed in JP2019-115217A, for example.

A rotor described in JP2019-115217A includes a rotor core, end plates for pressing and holding end surfaces of the rotor core, and a rotor shaft to which the rotor core and the end plates are attached. A plurality of notch portions are provided on an inner peripheral surface of the end plate on one side in an axial direction. The rotor shaft includes a hollow cylindrical attachment portion (rotor hub) attached to the rotor core. A thin portion (a convex portion protruding to a side of the end plate) is provided at an end portion of the attachment portion. The thin portion is crimped to the notch portions of the end plate, and thereby, a crimped portion is formed.

CITATION LIST

Patent Literature

Patent Literature 1: JP2019-115217A

SUMMARY OF DISCLOSURE

Technical Problem

Herein, although not described in JP2019-115217A, in some cases, an oil flow path through which cooling oil for cooling the rotor core flows is provided in such a way as to extend in the axial direction in the vicinity of an inner peripheral edge of the rotor core. It is considered that the cooling oil is not discharged to an outside of the rotor core in such a case since an axial-direction end of the oil flow path is closed by the crimped portion protruding to a side of the end plate. For this reason, there is desired a rotor being able to easily discharge, to an outside, cooling oil flowing through the oil flow path of the rotor core when a rotor hub is crimped to the end plate.

The present disclosure has been made in order to solve the problem as described above, and one object of the present disclosure is to provide a rotor being able to easily discharge, to an outside, cooling oil flowing through an oil flow path of a rotor core when a rotor hub is crimped to an end plate.

Solution to Problem

In order to achieve the above-described object, a rotor in one aspect of this disclosure includes: a rotor core; a first end plate provided on an end surface on one side in an axial direction in the rotor core; a second end plate provided on an end surface on an opposite side in the axial direction in the rotor core; and a rotor hub including a cylindrical portion that is provided in such a way as to be adjacent to the rotor core, on a radial-direction inner side of the rotor core, and fixes the rotor core, wherein the rotor core includes a plurality of oil flow paths that are provided in such a way as to extend along the axial direction and through which first cooling oil for cooling the rotor core flows, an end portion on one side in the axial direction in the cylindrical portion of the rotor hub includes: a plurality of crimped portions that are crimped with the first end plate; and a plurality of pairs of notch portions arranged in such a way as to be adjacent to the crimped portions in a peripheral direction of the rotor core, on respective both sides of a plurality of the crimped portions, the first end plate includes a first opening portion that is provided at a first position corresponding to a position where the crimped portion of the cylindrical portion is not arranged, in the peripheral direction, is connected to a first oil flow path among a plurality of the oil flow paths, and is constituted of a hole or a notch provided in the vicinity of an inner peripheral edge of the first end plate, and the second end plate includes a second opening portion that is provided at a second position corresponding to a position where the crimped portion of the cylindrical portion is arranged, in the peripheral direction, is connected to a second oil flow path other than the first oil flow path among a plurality of the oil flow paths, and is constituted of a hole or a notch provided in the vicinity of an inner peripheral edge of the second end plate. The vicinity of the inner peripheral edge has a meaning of including both of the inner peripheral edge itself and an area close to the inner peripheral edge.

In the rotor according to one aspect of this disclosure, as described above, the first end plate includes the first opening portion that is provided at the first position corresponding to a position where the crimped portion of the cylindrical portion is not arranged, in the peripheral direction, and is connected to the first oil flow path, and the second end plate includes the second opening portion that is provided at the second position corresponding to a position where the crimped portion of the cylindrical portion is arranged, in the peripheral direction, and is connected to the second oil flow path. Thereby, at the first position corresponding to a position where the crimped portion is not arranged, the first opening portion of the first end plate is not covered (closed) with the crimped portion from the axial direction, and thus, the first cooling oil flowing through the first oil flow path can be discharged from the first opening portion to an outside. Even when the crimped portion is provided at a position where the second oil flow path is covered (closed) from the axial direction, the first cooling oil flowing through the second oil flow path can be discharged from the second opening portion of the second end plate on an opposite side to the crimped portion. As a result, when the rotor hub is crimped to the first end plate, the first cooling oil flowing through the oil flow path of the rotor core can be easily discharged to an outside.

A plurality of pairs of the notch portions arranged in such a way as to be adjacent to the crimped portions on respective peripheral-direction both sides of a plurality of the crimped portions are provided, and thereby, tensile stress can be prevented from being generated in a radial direction, due to crimping (deforming in such a way as to be pushed down to a radial-direction outer side) the crimped portions, at parts that are in the end portion of the cylindrical portion and are on peripheral-direction both sides of the crimped portions. Providing the notch portions reduces an area where a load is applied by the crimping, and thus, a device (equipment) for applying a load can be made smaller in size.

Advantageous Effects of Disclosure

According to the present disclosure, when a rotor hub is crimped to an end plate, cooling oil flowing through an oil flow path of a rotor core can be easily discharged to an outside.

DESCRIPTION OF EMBODIMENTS

Figure 1:
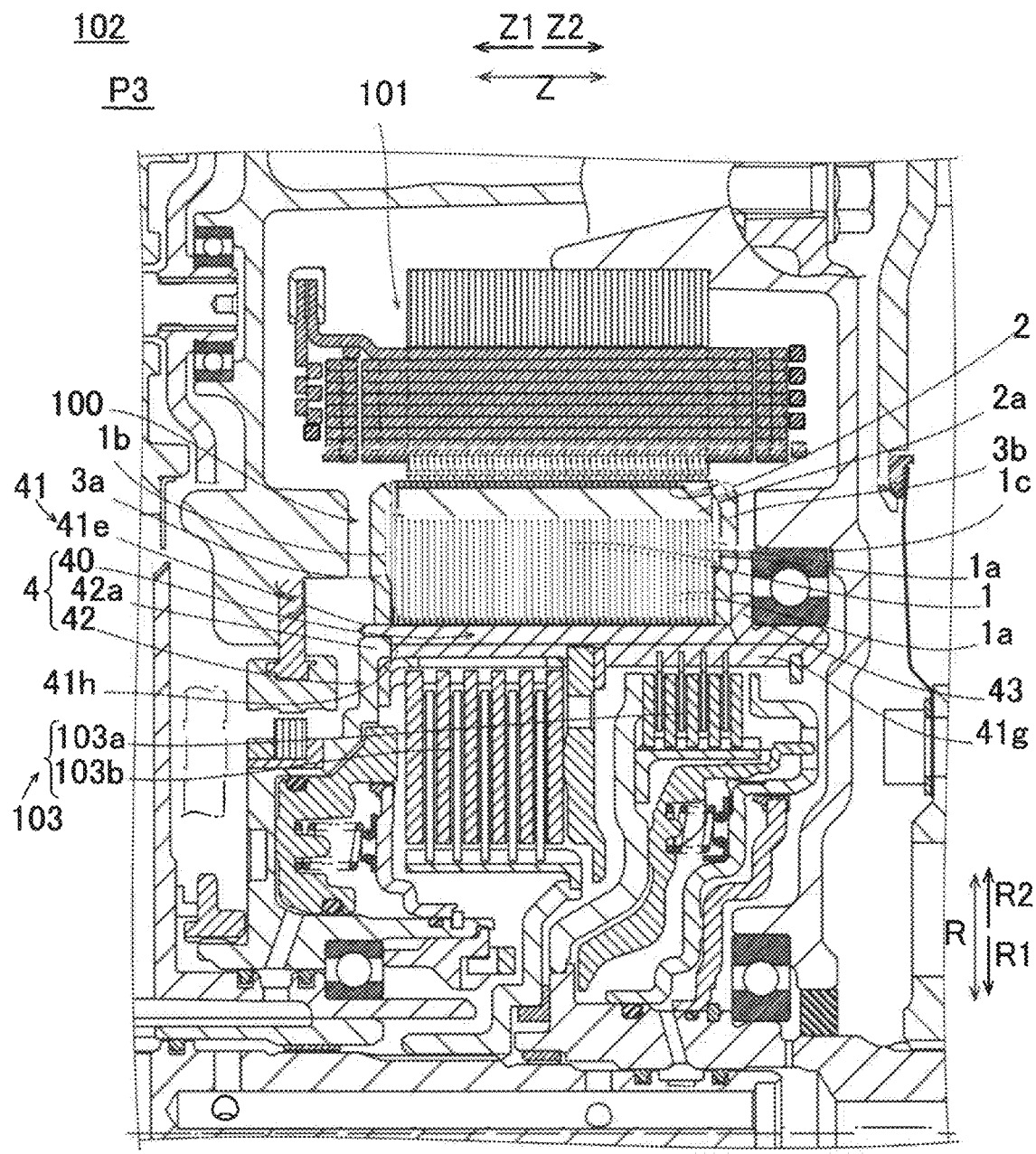
FIG. 1 is a sectional view illustrating a configuration of a rotating electric machine according to one embodiment.

Hereinafter, an embodiment of the present disclosure will be described with reference to the drawings.

A rotor 100 according to the present embodiment will be described with reference to FIG. 1 to FIG. 5.

In the present description, "axial direction" means a direction along the rotational axis C (refer to FIG. 2) of a rotor 100, and means a Z direction in the drawings. Further, "radial direction" means a radial direction (an R1 direction or an R2 direction) of the rotor 100, and "peripheral direction" means a peripheral direction (an E1 direction or an E2 direction) of the rotor 100.

As illustrated in FIG. 1, the rotor 100 constitutes a rotating electric machine 102 together with a stator 101. The rotor 100 and the stator 101 are each formed in an annular shape. The rotor 100 is arranged on a radial-direction inner side of the stator 101 in such a way as to face the stator 101. In other words, in this embodiment, the rotating electric machine 102 is configured as an inner rotor type rotating electric machine. The rotor 100 includes a rotor shaft (not illustrated) connected to an engine, an axle, and the like via torque transmission members such as a gear. Torque of the rotor shaft is transmitted to the rotor core 1, and thereby, the rotor core 1 is rotated around the rotational axis C (refer to FIG. 2). For example, the rotating electric machine 102 is configured as a motor, a generator, or a motor and generator, and is configured in such a way as be mounted on a vehicle.

The rotor 100 includes the rotor core 1. The rotor core 1 is configured by stacking a plurality of electromagnetic steel plates 1a. The rotor core 1 includes a plurality of magnet insertion holes 2 extending in a stacking direction (the Z direction) of the electromagnetic steel plates 1a. A permanent magnet 2a is arranged in (inserted into) each of a plurality of the magnet insertion holes 2.

Figure 2:
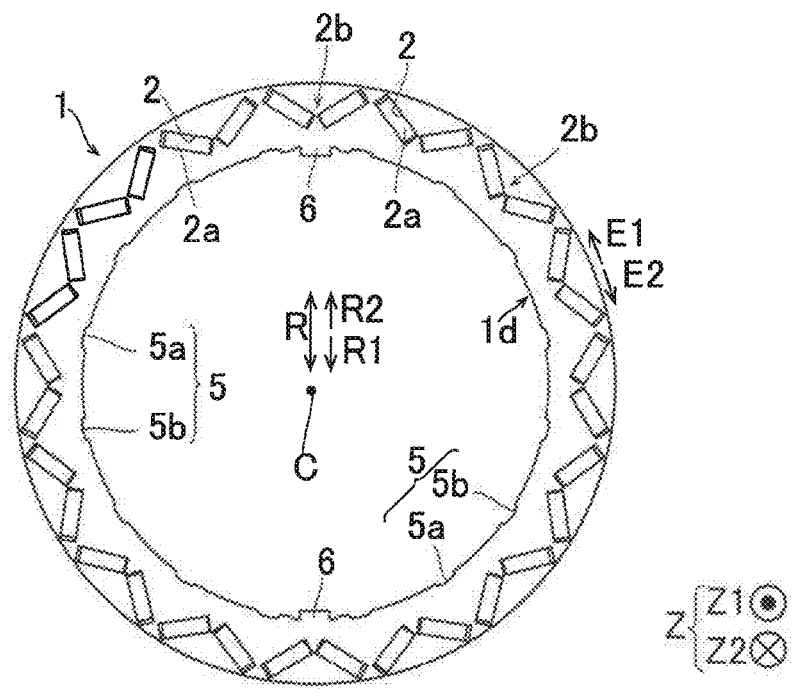
FIG. 2 is a plan view illustrating a configuration of a rotor core according to the one embodiment.

As illustrated in FIG. 2, a plurality of (in this embodiment, 32) magnet insertion holes 2 are provided in the rotor core 1. In other words, the rotating electric machine 102 is configured as an interior permanent magnet motor (IPM motor).

Specifically, the rotor core 1 includes a plurality of magnetic pole forming portions 2b that each forms a magnetic pole including a pair of the magnet insertion holes 2 adjacent to each other in the peripheral direction. In the rotor core 1, the 16 magnetic pole forming portions 2b are provided at equal angular intervals along the peripheral direction when viewed from the direction of the rotational axis C. A pair of the magnet insertion holes 2 in the magnetic pole forming portion 2b are arranged in a V-shape that is convex to a radial-direction inner side (R1 side).

As illustrated in FIG. 1, the rotor 100 includes an end plate 3a provided on an end surface 1b on one side (Z1 side) in the axial direction. The rotor 100 includes an end plate 3b provided on an end surface 1c on an opposite side (Z2 side) in the axial direction. Each of the end plate 3a and the end plate 3b is provided in order to prevent permanent magnets 2a from moving out of the magnet insertion holes 2. The end plate 3a and the end plate 3b are examples of "first end plate" and "second end plate" in claims, respectively.

The rotor 100 also includes a rotor hub 4. The rotor hub 4 includes a cylindrical portion 40. The cylindrical portion 40 is provided in such a way as to be adjacent to the rotor core 1, on a radial-direction inner side (R1 side) of the rotor core 1. The cylindrical portion 40 that fixes the rotor core 1 is formed in a cylindrical shape.

The rotor hub 4 includes a flange portion 42 welded (joined) to an end portion 41 on one axial-direction side (Z1 side) in the cylindrical portion 40. The flange portion 42 is provided in such a way as to cover a clutch portion 103 of the rotating electric machine 102 from one side (Z1 side) in the axial direction. The flange portion 42 is provided in such a way as to extend in a flange shape in such a way as to intersect with the axial direction. The clutch portion 103 is provided in such a way as to engage with the cylindrical portion 40 (a spline portion 41g described below), on a radial-direction inner side of the cylindrical portion 40.

The cylindrical portion 40 includes a support portion 43 provided in such a way as to support the rotor core 1 from an opposite side (Z2 side) in the axial direction. The support portion 43 is provided in such a way as to extend to a radial-direction outer side from the vicinity of an inner peripheral edge 1d (refer to FIG. 2) of the rotor core 1.

As illustrated in FIG. 2, the rotor core 1 includes a plurality of oil flow paths 5 that are provided in such a way as to extend along the axial direction and through which cooling oil 90 (refer to the dashed arrows in FIG. 4 and FIG. 5) for cooling the rotor core 1 flows. A plurality of the oil flow paths 5 are provided on the inner peripheral edge 1d of the rotor core 1, and are constituted of notches provided in such a way as to extend along the axial direction. Specifically, the oil flow paths 5 are constituted of holes extending in the axial direction and formed by closing the notches on the inner peripheral edge 1d of the rotor core 1 with the cylindrical portion 40 from a radial-direction inner side. The cooling oil 90 is one example of "first cooling oil" in claims.

Figure 3:
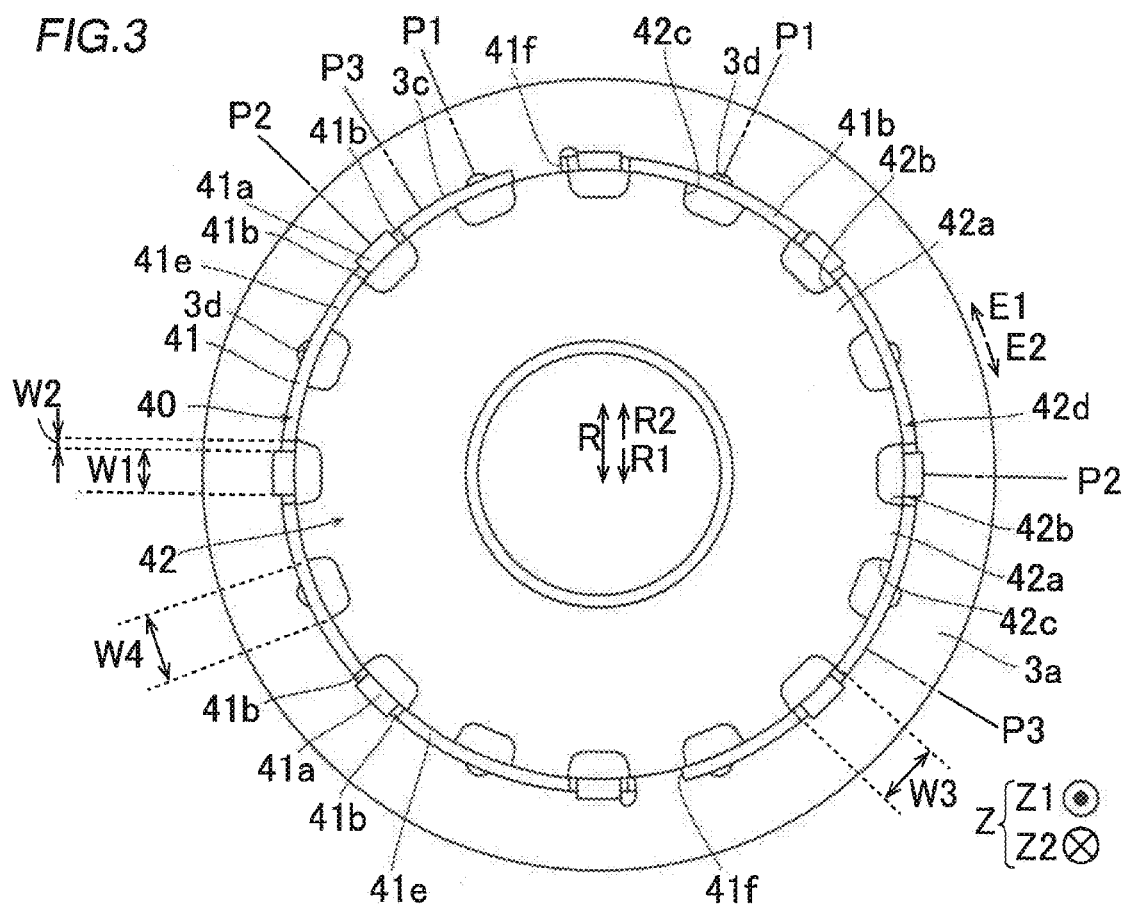
FIG. 3 is a plan view illustrating a configuration of a rotor (rotor hub) according to the one embodiment.

As illustrated in FIG. 3, the end portion 41 on one axial-direction side (Z1 side) in the cylindrical portion 40 of the rotor hub 4 includes a plurality of crimped portions 41a that are crimped with the end plate 3a. The end portion 41 includes a plurality of pairs of notch portions 41b arranged in such a way as to be adjacent to the crimped portions 41a in the peripheral direction, on respective both sides of a plurality of the crimped portions 41a. In this embodiment, the crimped portions 41a are formed by pushing down the end portion 41 of the cylindrical portion 40 to a radial-direction outer side (refer to FIG. 5) and by being crimped to an inner peripheral edge 3c of the end plate 3a. Thereby, the crimped portions 41a can be easily formed by simply pushing down the end portion 41 of the cylindrical portion 40 to a radial-direction outer side.

Thus, a plurality of pairs of the notch portions 41b arranged in such a way as to be adjacent to the crimped portions 41a, on respective peripheral-direction both sides of a plurality of the crimped portions 41a are provided, and thereby, tensile stress can be prevented from being generated in the radial direction, due to crimping (deforming in such a way as to be pushed down to a radial-direction outer side) the crimped portions, at the parts that are in the end portion 41 of the cylindrical portion 40 and that are on peripheral-direction both sides of the crimped portions 41a. Providing the notch portions 41b reduces an area where a load is applied by the crimping, and thus, a device (equipment) for applying a load can be made smaller in size.

A width W1 of the crimped portion 41a in the peripheral direction is larger than a width W2 of the notch portion 41b in the peripheral direction. The width W1 of the crimped portion 41a in the peripheral direction is smaller than each of a width W3 of the below-described opening portion 42b in the peripheral direction and a width W4 of the below-described opening portion 42c in the peripheral direction, and is larger than ½ of each of the width W3 and the width W4. The opening portion 42b and the opening portion 42c have the shapes same as each other. In other words, the width W3 and the width W4 are the sizes same as each other.

Figure 4:
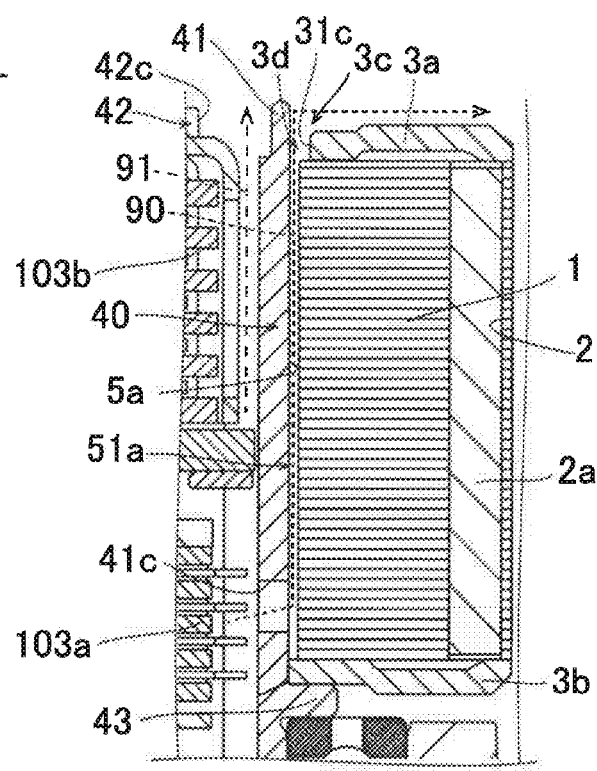
FIG. 4 is a sectional view of the rotor at a peripheral-direction position (position P1) where a crimped portion according to the one embodiment is not provided.

Herein, as illustrated in FIG. 4, the end plate 3a includes an opening portion 3d that is provided at a position P1 corresponding to a position where the crimped portion 41a of the cylindrical portion 40 is not arranged, in the peripheral direction, that is connected to the first oil flow path 5a among a plurality of the oil flow paths 5, and that is provided in the vicinity of the inner peripheral edge 3c of the end plate 3a. The position P1 and the opening portion 3d are examples of "first position" and the "first opening portion" in claims, respectively. For convenience, FIG. 3 illustrates only two among the positions P1 that are positions in the peripheral direction and that are provided by the number of the opening portions 3d.

In this embodiment, the first oil flow path 5a is provided at the position P1, is constituted of a hole 51a extending along the axial direction and formed by closing the notch on the inner peripheral edge 1d of the rotor core 1 with the cylindrical portion 40 from a radial-direction inner side, and is connected to the opening portion 3d of the end plate 3a. Thus, the first oil flow path 5a can be easily formed by the notch on the inner peripheral edge 1d of the rotor core 1 and the cylindrical portion 40. The hole 51a is one example of "first hole". In this embodiment, the opening portion 3d is constituted of a hole surrounded by a notch 31c provided on the inner peripheral edge 3c of the end plate 3a and the end portion 41 on a radial outer side in the rotor hub 4. Thereby, the opening portion 3d can be easily formed by the notch 31c provided on the inner peripheral edge 3c of the end plate 3a and the end portion 41 on a radial outer side in the rotor hub 4. The notch 31c is one example of "first notch" in claims.

Figure 5:
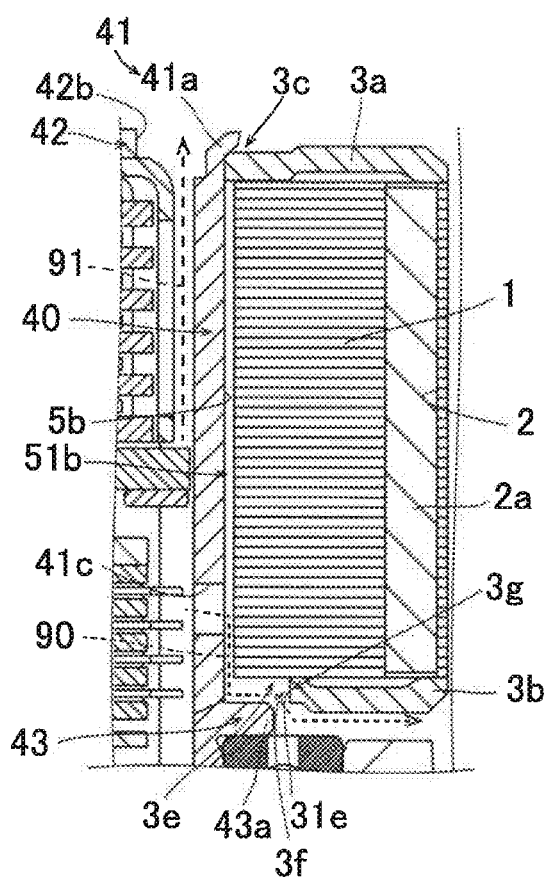
FIG. 5 is a sectional view of the rotor at a peripheral-direction position (position P2) where the crimped portion according to the one embodiment is provided.

As illustrated in FIG. 5, the end plate 3b includes an opening portion 3f that is provided at a position P2 corresponding to a position where the crimped portion 41a of the cylindrical portion 40 is arranged, in the peripheral direction, that is connected to a second oil flow path 5b other than the first oil flow path 5a among a plurality of the oil flow paths 5, and that is provided in the vicinity of the inner peripheral edge 3e of the end plate 3b. The position P2 and the opening portion 3f are examples of "second position" and "second opening portion" in claims, respectively. For convenience, FIG. 3 illustrates only two among the positions P2 that are positions in the peripheral direction and that are provided by the number of the crimped portions 41a. In this embodiment, the second oil flow path 5b is provided at the position P2, is constituted of a hole 51b extending in the axial direction and formed by closing the notch on the inner peripheral edge 1d of the rotor core 1 with the cylindrical portion 40 from a radial-direction inner side, and is connected to the opening portion 3f of the end plate 3b. Thus, the second oil flow path 5b can be easily formed by the notch on the inner peripheral edge 1d of the rotor core 1 and the cylindrical portion 40. The hole 51b is one example of "second hole". In this embodiment, the opening portion 3f is constituted of a hole surrounded by a notch 31e provided on the inner peripheral edge 3e of the end plate 3b and the end portion 43a on a radial outer side in the rotor hub 4. Thereby, the opening portion 3f can be easily formed by the notch 31e provided on the inner peripheral edge 3e of the end plate 3b and the end portion 43a on a radial-direction outer side in the rotor hub 4. The notch 31e is one example of "second notch" in claims.

Thereby, at the position P1 corresponding to the position where the crimped portion 41a is not arranged, the opening portion 3d of the end plate 3a is not covered (closed) with the crimped portion 41a from the axial direction, and thus, the cooling oil 90 flowing through the first oil flow path 5a can be discharged from the opening portion 3d to an outside. Even when the crimped portion 41a is provided at the position where the second oil flow path 5b is covered (closed) from the axial direction, the cooling oil 90 flowing through the second oil flow path 5b can be discharged from the opening portion 3f of the end plate 3b on an opposite side of the crimped portion 41a. As a result, when the rotor hub 4 is crimped to the rotor core 1, the cooling oil 90 flowing through the oil flow paths 5 of the rotor core 1 can be easily discharged to an outside.

The opening portion 3d is constituted of the notch provided on the inner peripheral edge 3c of the end plate 3a. The opening portion 3f is constituted of the notch provided on the inner peripheral edge 3e of the end plate 3b. Thereby, the opening portion 3d is allowed to be easily arranged on a more radial-direction inner side in the end plate 3a. The opening portion 3f is allowed to be easily arranged on a more radial-direction inner side in the end plate 3b.

An end portion 3g on a radial-direction outer side in the opening portion 3f is provided on a radial-direction outer side of the end portion 43a on a radial-direction outer side in the support portion 43 of the cylindrical portion 40. Thereby, the opening portion 3f is not closed by the support portion 43, and thus, the cooling oil 90 is allowed to be discharged to an outside via the opening portion 3f.

As illustrated in FIG. 4, the cylindrical portion 40 includes a hole portion 41c for introducing the cooling oil 90 from a first clutch 103a of the clutch portion 103 to the first oil flow path 5a. The hole portion 41c is provided at each of a plurality of the positions P1. The cooling oil 90 that has been introduced from the hole 41c into the first oil flow path 5a flows through the first oil flow path 5a, and is discharged from the opening portion 3d of the end plate 3a to an outside of the rotor core 1. The first clutch 103a is provided at a position in the vicinity of the end plate 3b in the axial direction. The hole portion 41c is provided at a position facing the first clutch 103a in the radial direction. Specifically, the hole portion 41c is provided at the position facing, in the radial direction, a portion on an opposite side (Z2 side) in the rotor core 1 in the axial direction.

As illustrated in FIG. 5, the cylindrical portion 40 includes a hole portion 41d for introducing the cooling oil 90 from the first clutch 103a to the second oil flow path 5b. The hole portion 41d is provided at each of a plurality of the positions P2. The cooling oil 90 that has been introduced from the hole portion 41d into the second oil flow path 5b flows through the second oil flow path 5b, and is discharged from the opening portion 3f of the end plate 3b to an outside of the rotor core 1. The hole portion 41d is provided at a position facing the first clutch 103a in the radial direction. Specifically, the hole portion 41d is provided at the position facing, in the radial direction, a portion on an opposite side (Z2 side) in the rotor core 1 in the axial direction. The hole portion 41d is arranged at the position substantially same as the hole portion 41c in the axial direction.

As illustrated in FIG. 3, a plurality of weld parts 41e that are in the end portion 41 of the cylindrical portion 40 and that are welded to the flange portion 42 are peripherally provided in such a way as to be adjacent to respective ones of a plurality of the crimped portions 41a via the notch portions 41b in the peripheral direction. In other words, the weld parts 41e are provided in such a way as be divided from the crimped portions 41a by the notch portions 41b. The weld part 41e is one example of "joint part" in claims.

Thereby, a weld between the weld part 41e of the cylindrical portion 40 and the flange portion 42 can be prevented from being torn off due to stress when the crimped portion 41a is crimped.

The flange portion 42 includes a plurality of protrusion portions 42a that are provided in such a way as to protrude to a radial-direction outer side toward a plurality of the respective weld parts 41e of the cylindrical portion 40 and that are welded to the corresponding weld parts 41e. Thereby, the flange portion 42 and the cylindrical portion 40 are allowed to be welded to each other at a peripheral-direction position where the protrusion portion 42a is provided, and the flange portion 42 and the cylindrical portion 40 are allowed to be separated from each other at a peripheral-direction position where the protrusion portion 42a is not provided.

Each of a plurality of the protrusion portions 42a (weld parts 41e) is provided at a position P3 corresponding to a position other than the positions P1 and the positions P2 in the peripheral direction. Specifically, the position P3 is a position corresponding to a position between the position P1 and the position P2 adjacent to each other in the peripheral direction. For convenience, FIG. 3 illustrates only two among the positions P3 that are positions in the peripheral direction and that are provided by the number of the protrusion portions 42a (weld parts 41e).

The cylindrical portion 40 includes a groove portion 41f that engages with a key 6 (refer to FIG. 2) of the rotor core 1. The two groove portions 41f are provided at positions facing each other with respect to the rotational axis C as the center. The cylindrical portion 40 and the flange portion 42 are not welded to each other at a position where the groove portion 41f is provided.

The flange portion 42 includes a plurality of opening portions 42b that are arranged at positions corresponding to the positions P2 in the peripheral direction and that are provided on radial-direction inner sides of the crimped portions 41a in such a way as to be adjacent to the crimped portions 41a. The opening portion 42b is constituted of a notch for causing a jig (not illustrated) used at the time of crimping the crimped portion 41a to escape thereinto. The opening portion 42b is one example of "third opening portion" in claims.

Thereby, crimping work can be performed while the crimping jig is caused to escape into the opening portion 42b, and thus, the crimping jig can be prevented from interfering with the flange portion 42.

Specifically, each of a plurality of the opening portions 42b is constituted of a notch provided on an outer peripheral edge 42d of the flange portion 42.

Thereby, differently from a case where the opening portion 42b is constituted of a hole portion, a part (i.e., the outer peripheral edge 42d of the flange 42) that becomes an obstacle is not provided between the crimped portion 41a and the opening portion 42b in the radial direction, thus allowing the crimping jig to be easily caused to escape into the opening portion 42b.

Each of a plurality of the opening portions 42b serves also as an opening through which cooling oil 91 for cooling the clutch portion 103 is caused to pass. The cooling oil 91 is one example of "second cooling oil" in claims.

Thereby, an opening through which the cooling oil 91 for cooling the clutch portion 103 is caused to pass does not need to be formed separately from the opening portion 42b, and thus, a configuration of the flange portion 42 can be simplified.

Specifically, each of a plurality of the opening portions 42b is provided in such a way as to cause the cooling oil 91 for cooling a second clutch 103b of the clutch portion 103 to pass therethrough. The second clutch 103b is provided in such a way as to engage with the cylindrical portion 40, on one axial-direction side (Z1 side) of the first clutch 103a. The second clutch 103b is a clutch used in a wet start clutch (WSC) mode (a running mode of running with a power source including the engine, by slip-controlling the second clutch 103b while the first clutch 103a is in an engaged state).

The flange portion 42 includes a plurality of opening portions 42c that are arranged at positions corresponding to the positions P1 in the peripheral direction and through which the cooling oil 91 is caused to flow. Thereby, the cooling oil 91 is allowed to be discharged to an outside via the opening portions 42c at the positions P1 in the peripheral direction.

Similarly to the opening portions 42b, each of a plurality of the opening portions 42c is constituted of a notch provided on the outer peripheral edge 42d of the flange portion 42.

The opening portion 42b, the opening portion 42c, and the protrusion portion 42a are arranged in mutual alternation in the peripheral direction. Specifically, the arrangement is made in the order of the opening portion 42b, the protrusion portion 42a, the opening portion 42c, the protrusion portion 42a, the opening portion 42b, . . . in the peripheral direction. In other words, the flange portion 42 is opened by the opening portion 42b or the opening portion 42c at every position in the peripheral direction other than the position where the protrusion portion 42a (the below-described spline portion 41g) is provided.

As illustrated in FIG. 1, the cylindrical portion 40 includes a plurality of the spline portions 41g that are provided in such a way as to extend along the axial direction while protruding toward the clutch portion 103 provided on a radial-direction inner side of the cylindrical portion 40, and that engage with the clutch portion 103. Each of a plurality of the spline portions 41g is arranged at the position P3, in the peripheral direction, where the weld part 41e of the cylindrical portion 40 is provided.

Each of a plurality of the spline portions 41g is provided in such a way as to contact against the flange portion 42, at an end portion 41h on one axial-direction side.

Thereby, the flange portion 42 is supported by the spline portion 41g from an opposite side in the axial direction, and thus, the flange portion 42 can be stably fixed.

Specifically, each of a plurality of the spline portions 41g is provided in such a way as to contact against the protrusion portion 42a of the flange portion 42, at the end portion 41h. In other words, each of a plurality of the protrusion portions 42a is provided in such a way as to overlap with the corresponding spline portion 41g when viewed from the axial direction.

Thereby, each of a plurality of the opening portions 42b provided between the protrusion portions 42a of the flange portion 42 is arranged in such a way as to overlap, when viewed from the axial direction, with an area between the spline portions 41g adjacent to each other in the peripheral direction. Similarly, each of a plurality of the opening portions 42c provided between the protrusion portions 42a of the flange portion 42 is also arranged in such a way as to overlap with an area between the spline portions 41g adjacent to each other in the peripheral direction, when viewed from the axial direction. As a result of these, the cooling oil 91 flowing between the spline portions 41g adjacent to one another in the peripheral direction is allowed to be efficiently discharged from the opening portions 42b and the opening portions 42c.

The spline portions 41g are formed by broaching. The broaching is removal machining of shaving a surface or inner surface of a workpiece by using a long tool called "broach".

Modified Examples

The embodiment disclosed at the present time should be considered to be exemplification in all respects and be not restrictive one. The scope of the present disclosure is indicated by the scope of claims rather than the above description of the embodiment, and further includes all modifications (modified examples) within the meaning and the scope that are equivalent to claims.

For example, an example in which the opening portion 3d (first opening portion) is formed by the notch provided on the inner peripheral edge 3c of the end plate 3a (first end plate) is indicated in the above-described embodiment, but the present disclosure is not limited to this. The opening portion 3d may be constituted of a hole provided in an area close to the inner peripheral edge 3c.

An example in which the opening portion 3f (second opening portion) is formed by the notch provided on the inner peripheral edge 3e of the end plate 3b (second end plate) is indicated in the above-described embodiment, but the present disclosure is not limited to this. The opening portion 3f may be constituted of a hole provided in an area close to the inner peripheral edge 3e.

An example in which the rotor hub 4 includes the cylindrical portion 40 and the flange portion 42 formed separately from each other is indicated in the above-described embodiment, but the present disclosure is not limited to this. The cylindrical portion 40 and the flange portion 42 may be integrally formed.

An example in which the end portion 41 of the cylindrical portion 40 and the flange portion 42 are joined to each other by welding is indicated in the above-described embodiment, but the present disclosure is not limited to this. The end portion 41 of the cylindrical portion 40 and the flange portion 42 may be joined by a means other than welding (e.g., bonding by an adhesive).

An example in which each of the opening portion 42b (third opening portion) and the opening portion 42c is constituted of the notch provided on the outer peripheral edge 42d of the flange portion 42 is indicated in the above-described embodiment, but the present disclosure is not limited to this. Each of the opening portion 42b and the opening portion 42c may be constituted of a hole provided in an area close to the outer peripheral edge 42d.

An example in which the flange portion 42 is provided with the opening portion 42b (third opening portion) and the opening portion 42c is indicated in the above-described embodiment, but the present disclosure is not limited to this. For example, when the second clutch 103b is not provided and only the first clutch 103a is provided, the flange portion 42 does not need to be provided with the opening portion 42b and the opening portion 42c. In order to cause the crimping jig to escape, the flange portion 42 may be provided with only the opening 42b out of the opening 42b and the opening portion 42c.

An example in which the opening portion 42b (third opening portion) serves both as an opening for causing the cooling oil 91 (second cooling oil) to pass therethrough and as an opening for causing the crimping jig to escape thereinto is indicated in the above-described embodiment, but the present disclosure is not limited to this. An opening for causing the cooling oil 91 to pass therethrough and an opening for causing the crimping jig to escape thereinto may be separately provided.

It is understood by those skilled in the art that the above-described exemplified embodiment is a specific example of the following aspects.

A plurality of third opening portions (42b) are arranged in such a way as to overlap with an area between spline portions (41g) adjacent to each other in a peripheral direction, when viewed from the axial direction.

A flange portion (42) is provided in such a way as to protrude to a radial-direction outer side toward a plurality of respective joint parts (41e) of a cylindrical portion (40), and includes a plurality of protrusion portions (42a) joined to the corresponding joint parts (41e).

The flange portion (42) includes a fourth opening portion (42c) that is arranged at a position corresponding to a first position (P1) in the peripheral direction and through which second cooling oil (91) is caused to pass.

A first opening portion (3d) and a second opening portion (3f) are constituted of notches provided on an inner peripheral edge (3c) of a first end plate (3a) and an inner peripheral edge (3e) of a second end plate (3b), respectively.

Each of a plurality of the third opening portions (42b) is constituted of a notch provided on an outer peripheral edge (42d) of the flange portion (42).

REFERENCE SIGNS LIST

1 . . . rotor core, 1b . . . end surface (end surface on one side), 1c . . . end surface (end surface on opposite side), 3a . . . end plate (first end plate), 3b . . . end plate (second end plate), 3c . . . inner peripheral edge (inner peripheral edge of first end plate), 3d . . . opening portion (first opening portion), 3e . . . inner peripheral edge (inner peripheral edge of second end plate), 3f . . . opening portion (second opening portion), 4 . . . rotor hub, 5 . . . oil flow path, 5a . . . first oil flow path, 5b second oil flow path, 31c . . . notch (first notch), 31e . . . notch (second notch), 40 . . . cylindrical portion, 41 . . . end portion (end portion of cylindrical portion), 41a . . . crimped portion, 41b . . . notch portion, 41e . . . weld part (joint part), 41g . . . spline portion, 41h . . . end portion (end portion of spline portion), 42 . . . flange portion, 42b . . . opening portion (third opening portion), 51a . . . hole (first hole), 51b . . . hole (second hole), 90 . . . cooling oil (first cooling oil), 91 . . . cooling oil (second cooling oil), 100 . . . rotor, 103 . . . clutch portion, P1 . . . position (first position), P2 . . . position (second position)

The invention claimed is:

1. A rotor comprising:
a rotor core;
a first end plate being provided on an end surface on one side in an axial direction in the rotor core;
a second end plate being provided on an end surface on an opposite side in the axial direction in the rotor core; and a rotor hub including a cylindrical portion that is provided in such a way as to be adjacent to the rotor core, on a radial-direction inner side of the rotor core, and fixes the rotor core, wherein the rotor core includes a plurality of oil flow paths that are provided in such a way as to extend along the axial direction and through which first cooling oil for cooling the rotor core flows, an end portion on one side in the axial direction in the cylindrical portion of the rotor hub includes: a plurality of crimped portions that are crimped with the first end plate; and a plurality of pairs of notch portions arranged in such a way as to be adjacent to the crimped portions in a peripheral direction of the rotor core, on respective both sides of the plurality of crimped portions, the first end plate includes a first opening portion that is provided at a first position corresponding to a position where the crimped portion of the cylindrical portion is not arranged, in the peripheral direction, is connected to a first oil flow path among the plurality of oil flow paths, and is constituted of a hole or a notch being provided in vicinity of an inner peripheral edge of the first end plate, and the second end plate includes a second opening portion that is provided at a second position corresponding to a position where the crimped portion of the cylindrical portion is arranged, in the peripheral direction, is connected to a second oil flow path other than the first oil flow path among the plurality of oil flow paths, and is constituted of a hole or a notch being provided in vicinity of an inner peripheral edge of the second end plate.

2. The rotor according to claim 1, wherein
the first oil flow path is provided at the first position, is constituted of a first hole extending along an axial direction and being formed by closing a notch on an inner peripheral edge of the rotor core with the cylindrical portion from a radial-direction inner side, and is connected to the first opening portion of the first end plate.

3. The rotor according to claim 1, wherein
the second oil flow path is provided at the second position, is constituted of a second hole extending along an axial direction and being formed by closing a notch on an inner peripheral edge of the rotor core with the cylindrical portion from a radial-direction inner side, and is connected to the second opening portion of the second end plate.

4. The rotor according to claim 1, wherein
the first opening portion is constituted of a hole surrounded by a first notch provided on the inner peripheral edge of the first end plate and an end portion on a radial outer side in the rotor hub.

5. The rotor according to claim 1, wherein
the second opening portion is constituted of a hole surrounded by a second notch provided on the inner peripheral edge of the second end plate and an end portion on a radial outer side in the rotor hub.

6. The rotor according to claim 1, wherein
the crimped portion is formed by pushing down an end portion of the cylindrical portion to a radial-direction outer side and by being crimped to the inner peripheral edge of the first end plate.

7. The rotor according to claim 1, wherein
The rotor hub includes a flange portion to be joined to the end portion on one side in the axial direction in the cylindrical portion, a plurality of joint parts that are in the end portion of the cylindrical portion and are joined to the flange portion are peripherally provided in such a way as to be adjacent to each of the plurality of crimped portions via the notch portions in the peripheral direction.

8. The rotor according to claim 7, wherein
the flange portion includes a plurality of third opening portions that are arranged at positions corresponding to the second positions in the peripheral direction, are provided on a radial-direction inner side of the crimped portion in such a way as to be adjacent to the crimped portion, and are constituted of holes or notches for causing a jig to escape, the jig being used at a time of crimping the crimped portion.

9. The rotor according to claim 8, wherein
each of the plurality of third opening portions serves also as an opening for causing second cooling oil to pass, the second cooling oil cooling a clutch portion that engages with the cylindrical portion, on a radial-direction inner side of the cylindrical portion.

10. The rotor according to claim 7, wherein
the cylindrical portion includes a plurality of spline portions that are provided in such a way as to extend along the axial direction while protruding toward a clutch portion provided on a radial-direction inner side of the cylindrical portion, and engage with the clutch portion, and each of the plurality of spline portions is provided in such a way as to contact against the flange portion, at an end portion on one side in the axial direction.

* * * * *